(12) United States Patent
Chang et al.

(10) Patent No.: US 12,140,793 B1
(45) Date of Patent: Nov. 12, 2024

(54) BACKLIGHT MODULE

(71) Applicant: Chicony Power Technology Co., Ltd., New Taipei (TW)

(72) Inventors: Cheng-Yi Chang, New Taipei (TW); Chun-Ting Lin, New Taipei (TW); Chen-Hao Chiu, New Taipei (TW); Ting-Wei Chang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/433,447

(22) Filed: Feb. 6, 2024

(30) Foreign Application Priority Data

Dec. 13, 2023  (TW) ................................ 112148575

(51) Int. Cl.
*F21V 8/00* (2006.01)
*H01H 13/02* (2006.01)
*H01H 13/83* (2006.01)

(52) U.S. Cl.
CPC ......... *G02B 6/0055* (2013.01); *G02B 6/0066* (2013.01); *H01H 13/023* (2013.01); *H01H 13/83* (2013.01)

(58) Field of Classification Search
CPC ...... H01H 13/023; H01H 13/70; H01H 13/83; H01H 2013/026; G02B 6/0021; G02B 6/0033–0043; G02B 6/005–006
See application file for complete search history.

(56) References Cited

U.S. PATENT DOCUMENTS

| 10,775,900 B2 | 9/2020 | Wu et al. |
| 11,846,799 B1 | 12/2023 | Chang |
| 2023/0343525 A1* | 10/2023 | Liu ................... H01H 13/023 |

FOREIGN PATENT DOCUMENTS

| CN | 114496627 A | 5/2022 |
| CN | 116895485 A | 10/2023 |
| EP | 2302879 A1 | 3/2011 |
| TW | 201303657 A | 1/2013 |
| TW | I598918 B | 9/2017 |
| TW | I674609 B | 10/2019 |
| TW | I724949 B | 4/2021 |
| TW | I780860 B | 10/2022 |
| TW | 202320103 A | 5/2023 |

(Continued)

*Primary Examiner* — Sean P Gramling
(74) *Attorney, Agent, or Firm* — CKC & Partners Co., LLC (57) ABSTRACT

A backlight module includes a film, a light guide plate disposed under the film, and a circuit board disposed under the light guide plate and provided with a light-emitting unit. The film includes a single-key transparent area, a light-shielding area disposed around the single-key transparent area, and a side transparent area disposed adjacent to or along an edge of the film. The light guide plate has a first microstructure group and a through hole correspondingly disposed under the single-key transparent area, a second microstructure group correspondingly disposed under the side transparent area, and a light-transmitting area partially correspondingly disposed under the light-shielding area. The light-emitting unit is accommodated in the through hole. A number of microstructures or a light-emitting area of the second microstructure group is greater than a number of microstructures or a light emitting area of the first microstructure group.

20 Claims, 7 Drawing Sheets

(56) References Cited

FOREIGN PATENT DOCUMENTS

| | | | |
|---|---|---|---|
| TW | 202341209 A | 10/2023 |
| WO | 2020/103867 A1 | 5/2020 |
| WO | 2023/202135 A1 | 10/2023 |

* cited by examiner

BACKLIGHT MODULE

CROSS-REFERENCE TO RELATED APPLICATION

The present application claims priority from Taiwan Application Serial Number 112148575, filed Dec. 13, 2023, which is herein incorporated by reference.

BACKGROUND

Technical Field

The present disclosure relates to a backlight module, and particularly to a backlight module for illuminated keyboards.

Description of Related Art

With development of e-sports industry, computer peripheral manufacturers have installed backlight modules in keyboards to create illuminated keyboards. However, most of current backlight modules are only configured to illuminate keys, which can no longer meet visual needs of players.

SUMMARY

A purpose of the present disclosure is to provide a backlight module that can efficiently solve the aforementioned problems.

In order to achieve the aforementioned purpose, the present disclosure provides a backlight module, which includes a film, a light guide plate, and a circuit board. The film includes a single-key transparent area, a light-shielding area, and a side transparent area. The light-shielding area is disposed around the single-key transparent area. The side transparent area is disposed adjacent to or along an edge of the film. The light guide plate is disposed under the film. The light guide plate has a first microstructure group, a second microstructure group, a light-transmitting area, and a through hole. The first microstructure group and the through hole are correspondingly disposed under the single-key transparent area. The second microstructure group is correspondingly disposed under the side transparent area. A part of the light-transmitting area is correspondingly disposed under the light-shielding area. The circuit board is disposed under the light guide plate and is provided with a light-emitting unit. The light-emitting unit is accommodated in the through hole. A part of a light emitted by the light-emitting unit is guided upward by the first microstructure group to pass through the single-key transparent area. Another part of the light emitted by the light-emitting unit is transmitted through the light-transmitting area and is guided upward by the second microstructure group to pass through the side transparent area. A number of microstructures or a light-emitting area of the second microstructure group is greater than a number of microstructures or a light-emitting area of the first microstructure group.

In one or more embodiments of the present disclosure, the film further includes a reflective portion. The reflective portion is disposed around the light-shielding area. The reflective portion is configured to reflect the light emitted by the light-emitting unit back to the light guide plate.

In one or more embodiments of the present disclosure, the film further includes a light-shielding member or a reflective member. The light-shielding member or the reflective member is disposed above the light-emitting unit. The light-shielding member is configured to block the light emitted directly upward by the light-emitting unit. The reflective member is configured to reflect the light emitted directly upward by the light-emitting unit back to the light guide plate.

In one or more embodiments of the present disclosure, a reflective layer is disposed on a surface of the circuit board facing the light guide plate. The reflective layer is configured to reflect the light emitted by the light-emitting unit back to the light guide plate.

In one or more embodiments of the present disclosure, a light-blocking unit is disposed on a surface of the reflective layer facing the light guide plate. The light-blocking unit is disposed corresponding to a part of the light-shielding area. The light-blocking unit has an opening on a side close to the side transparent area. The light-blocking unit is configured to block another part of the light emitted by the light-emitting unit from being reflected back to the light guide plate. Another part of the light emitted by the light-emitting unit is reflected back to the light guide plate through a part of the reflective layer under the opening of the light-blocking unit.

In one or more embodiments of the present disclosure, the first microstructure group includes a first zone and a second zone. The first zone is located between the second microstructure group and the second zone. A number of microstructures or a light-emitting area of the first zone is less than a number of microstructures or a light-emitting area of the second zone.

In one or more embodiments of the present disclosure, the first zone and the second zone are separated by a virtual extension line passing through a center of the light-emitting unit.

In one or more embodiments of the present disclosure, the number of the microstructures or the light-emitting area of the second microstructure group is greater than the number of the microstructures or the light-emitting area of the first zone.

In one or more embodiments of the present disclosure, the side transparent area is arranged along at least one of an upper edge, a lower edge, a left edge, and a right edge of the film.

In one or more embodiments of the present disclosure, the side transparent area is located outside the light-shielding area.

In one or more embodiments of the present disclosure, the second microstructure group is a continuous linear microstructure or comprises a plurality of microstructure units.

The present disclosure further provides a backlight module, which includes a film, a light guide plate, and a circuit board. The film includes a first single-key transparent area, a second single-key transparent area, a light-shielding area, and a side transparent area. The light-shielding area is disposed around the first single-key transparent area and the second single-key transparent area. The side transparent area is disposed adjacent to or along an edge of the film. The light guide plate is disposed under the film. The light guide plate has a first microstructure group, a second microstructure group, a third microstructure group, a light-transmitting area, a first through hole, and a second through hole. The first microstructure group and the first through hole are correspondingly disposed under the first single-key transparent area. The second microstructure group is correspondingly disposed under the side transparent area. The third microstructure group and the second through hole are correspondingly disposed under the second single-key transparent area. A part of the light-transmitting area is correspondingly disposed under the light-shielding area. The first microstructure group includes a first zone and a second zone. The first zone is located between the second microstructure group and the second zone. A number of microstructures or a light-emitting area of the second microstructure group is greater than a number of microstructures or a light-emitting area of the first zone. The circuit board is disposed under the light guide plate and provided with a first light-emitting unit and a second light-emitting unit. The first light-emitting unit and the second light-emitting unit are respectively accommodated in the first through hole and the second through hole. A part of a light emitted by the first light-emitting unit is guided upward by the first microstructure group to pass through the first single-key transparent area. Another part of the light emitted by the first light-emitting unit and a part of a light emitted by the second light-emitting unit are transmitted through the light-transmitting area and are guided upward by the second microstructure group to pass through the side transparent area.

In one or more embodiments of the present disclosure, the number of the microstructures or the light-emitting area of the first zone is less than a number of microstructures or a light-emitting area of the second zone.

In one or more embodiments of the present disclosure, the film further includes a light-shielding member or a reflective member. The light-shielding member or the reflective member is disposed above the first light-emitting unit. The light-shielding member is configured to block the light emitted directly upward by the first light-emitting unit. The reflective member is configured to reflect the light emitted directly upward by the first light-emitting unit back to the light guide plate.

In one or more embodiments of the present disclosure, the first zone and the second zone are separated by a virtual extension line passing through a center of the first light-emitting unit.

In one or more embodiments one or more embodiments of the present disclosure, the number of the microstructures or the light-emitting area of the second microstructure group is greater than a number of microstructures or a light-emitting area of the first microstructure group.

In one or more embodiments of the present disclosure, the side transparent area is located outside the light-shielding area.

In one or more embodiments of the present disclosure, a reflective layer is disposed on a surface of the circuit board facing the light guide plate. The reflective layer is configured to reflect the light emitted by the first light-emitting unit and the light emitted by the second light-emitting unit back to the light guide plate.

In one or more embodiments of the present disclosure, the film further includes a reflective portion. The reflective portion is disposed around the light-shielding area. The reflective portion is configured to reflect the light emitted by the first light-emitting unit and the light emitted by the second light-emitting unit back to the light guide plate.

In one or more embodiments of the present disclosure, the third microstructure group includes a plurality of outer frame microstructures.

In the above, in the backlight module of the present disclosure, the film includes the single-key transparent area and the side transparent area, and the first microstructure group and the second microstructure group of the light guide plate are correspondingly disposed under the single-key transparent area and the side transparent area, respectively. In this way, a part of the light emitted by the light-emitting unit disposed under the single-key transparent area can be guided upward by the first microstructure group to pass through the single-key transparent area, and another part of the light can be guided upward by the second microstructure group to pass through the side transparent area. Accordingly, in the backlight module of the present disclosure, the same light-emitting unit not only provides a luminous effect in the single-key transparent area, but also provides an additional luminous effect in the side transparent area, thereby increasing variability of the luminous effect without adding additional light-emitting units or backlight modules.

The above is only used to describe the problems to be solved by the present disclosure, technical solutions to solve the problems and their effects, and so on. Specific details of the present disclosure will be described in the following embodiments with reference to relevant drawings.

BRIEF DESCRIPTION OF THE DRAWINGS

In order to make the above and other purposes, features, advantages, and embodiments of the present disclosure easier to understand, the accompanying drawings are provided and described as follows.

DETAILED DESCRIPTION

A plurality of embodiments of the present disclosure will be described below with reference to the accompanying drawings. For the sake of clarity, many practical details will be described together in the following description. However, it should be understood that these practical details should not be used to limit the present disclosure. That is to say, in some embodiments of the present disclosure, these practical details are not necessary. In addition, for the sake of simplifying the accompanying drawings, some commonly used structures and components are illustrated in the accompanying drawings in a simple schematic manner.

Figure 1:
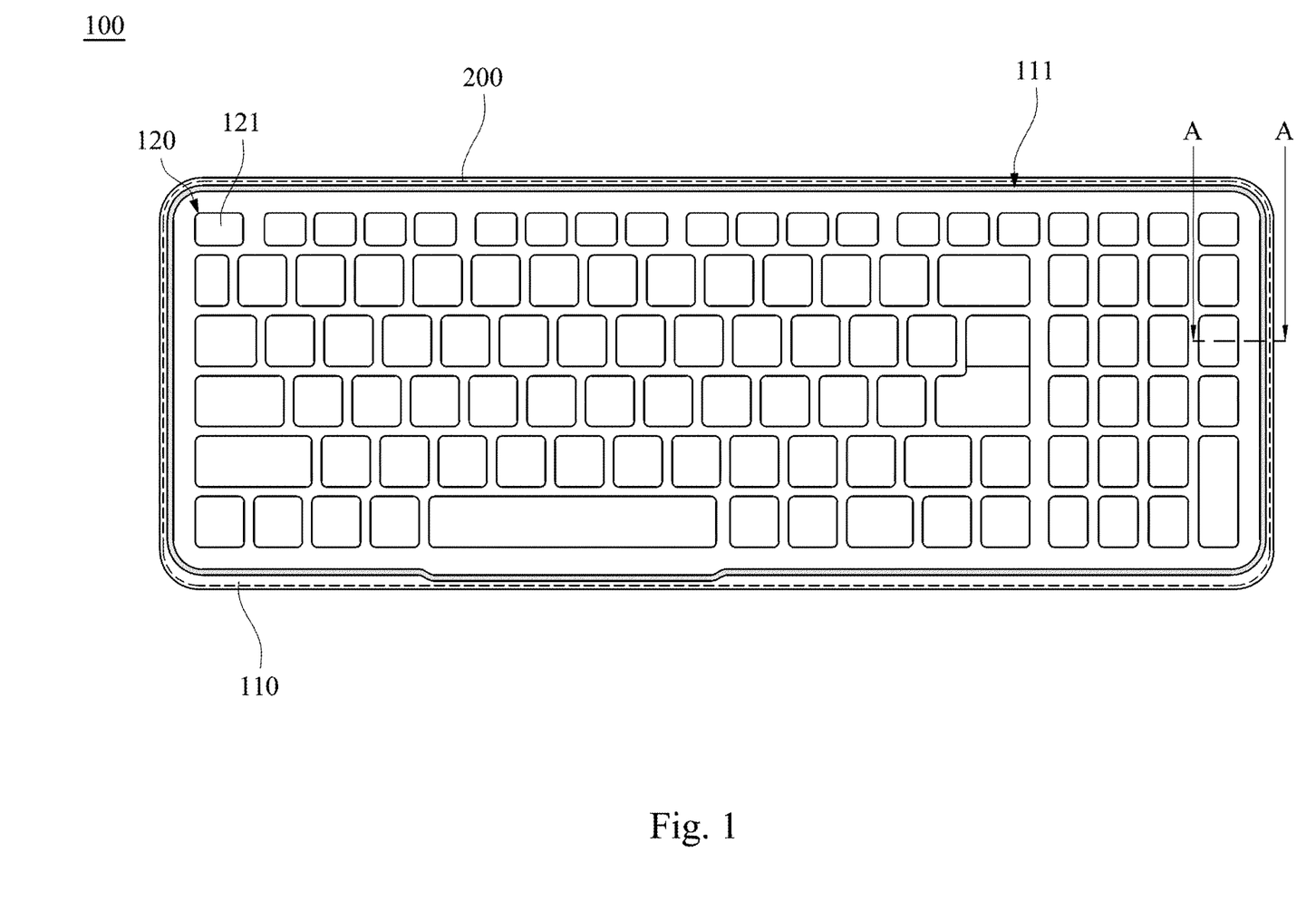
FIG. 1 is a schematic diagram of an illuminated keyboard according to an embodiment of the present disclosure.

Please refer to FIG. 1, which is a schematic diagram of an illuminated keyboard 100 according to an embodiment of the present disclosure. The illuminated keyboard 100 includes a housing 110, a keyboard module 120, and a backlight module 200. The keyboard module 120 is disposed on the housing 110 and includes a plurality of key units 121. The key units 121 are configured for the user to press. The backlight module 20 is disposed in the housing 110 and is located under the keyboard module 120. The backlight module 200 is configured to emit light toward the keyboard module 120, so that the illuminated keyboard 100 presents a luminous effect. In addition, the illuminated keyboard 100 of this embodiment may be a keyboard of a notebook computer, an external keyboard (e.g., a keyboard with a PS2 interface or a USB interface) for a desktop computer, or an input device containing keys, but is not limited thereto.

Figure 2:
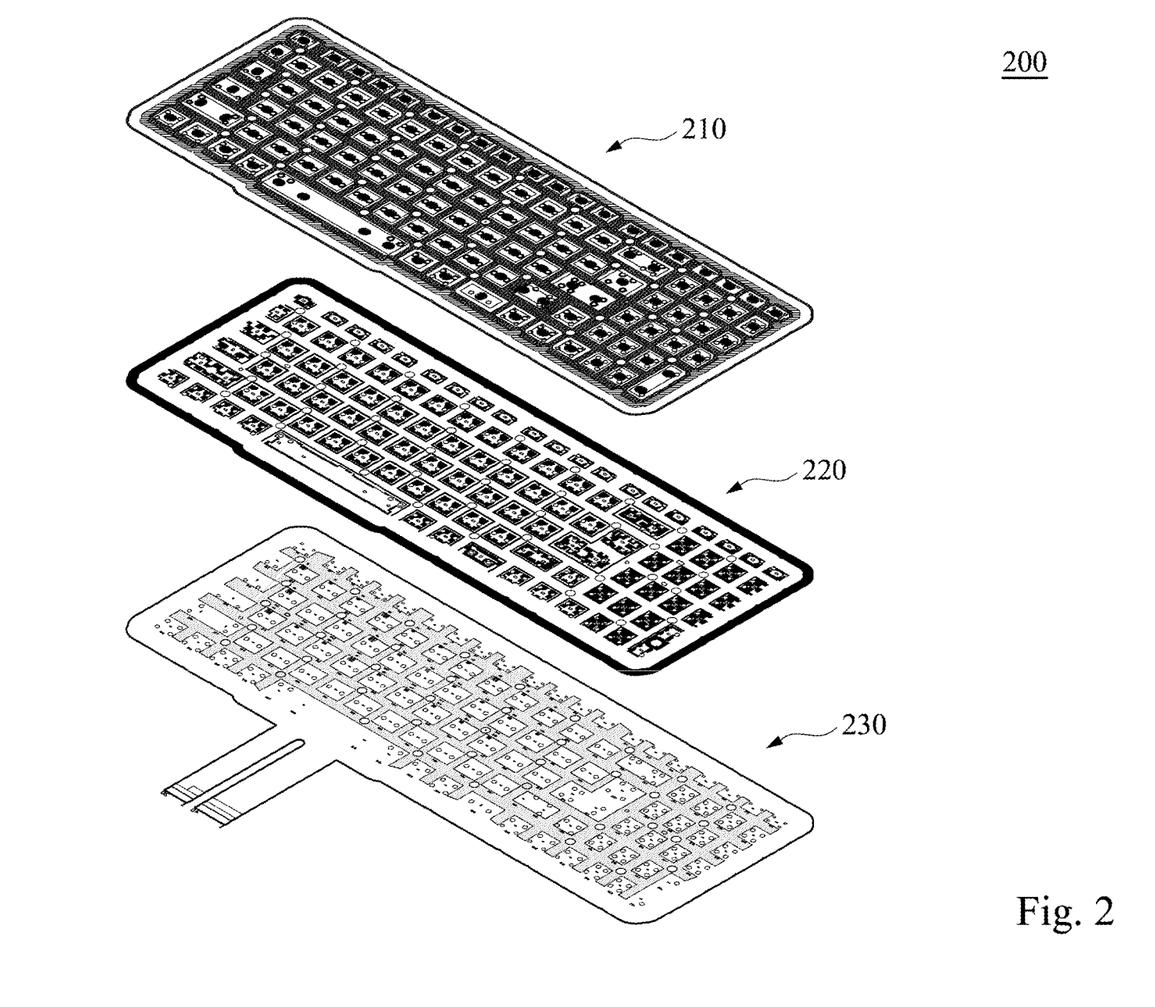
FIG. 2 is an exploded view of a backlight module in FIG. 1.
Figure 3:
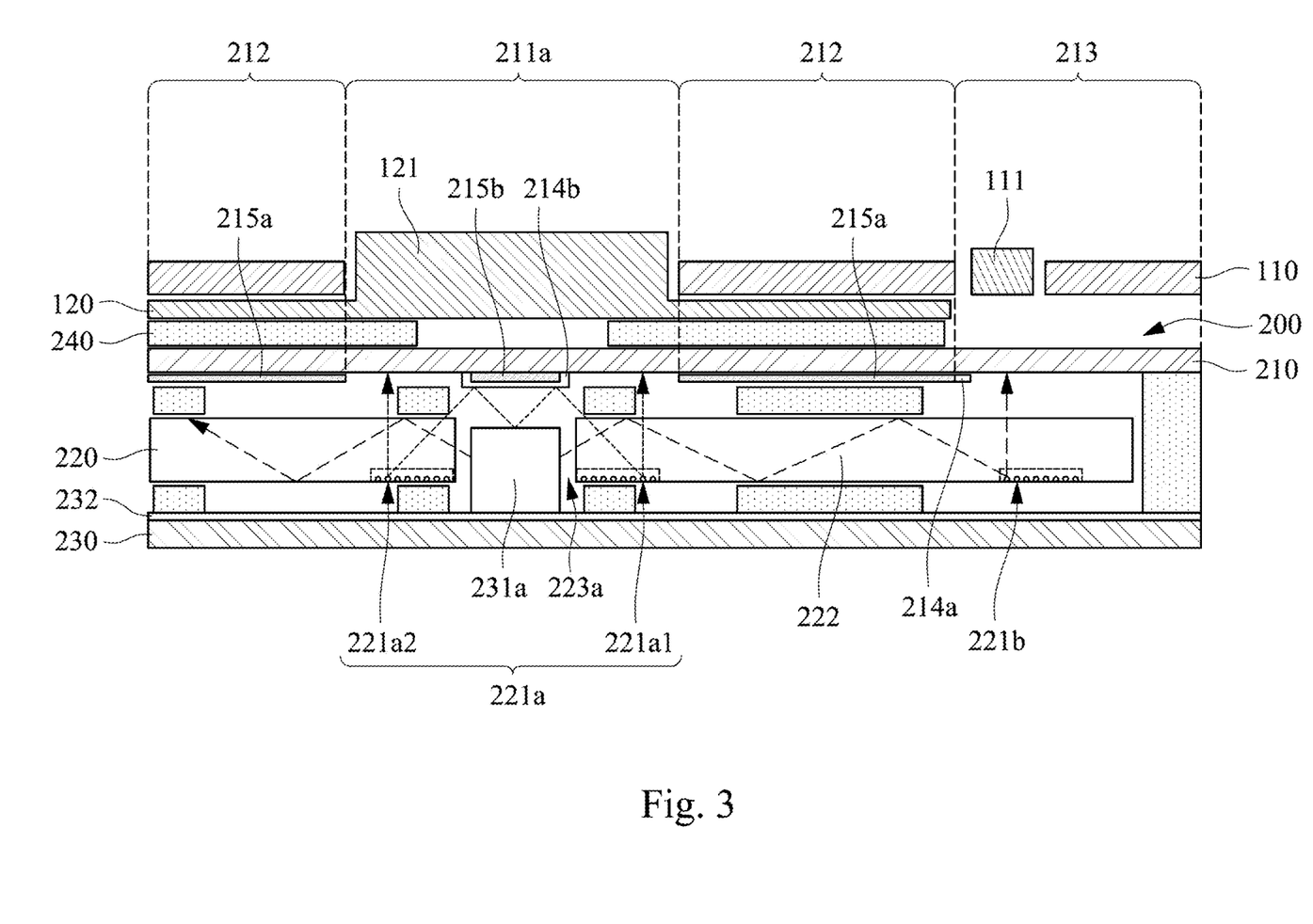
FIG. 3 is a cross-sectional view of the illuminated keyboard in FIG. 1 along a cutting plane line A-A.

Please refer to FIGS. 2 and 3. FIG. 2 is an exploded view of the backlight module 200 in FIG. 1. FIG. 3 is a cross-sectional view of the illuminated keyboard 100 in FIG. 1 along a cutting plane line A-A. In this embodiment, the backlight module 200 includes a film 210, a light guide plate 220, and a circuit board 230. The light guide plate 220 is disposed between the film 210 and the circuit board 230. Specifically, the film 210 is connected to a lower surface of the keyboard module 120 via a connecting member 240. The light guide plate 220 is connected to a lower surface of the film 210 via the connecting member 240. The circuit board 230 is connected to a lower surface of the light guide plate 220 via the connecting member 240. In some embodiments, the connecting member 240 is adhesive glue, but is not limited thereto.

Figure 4:
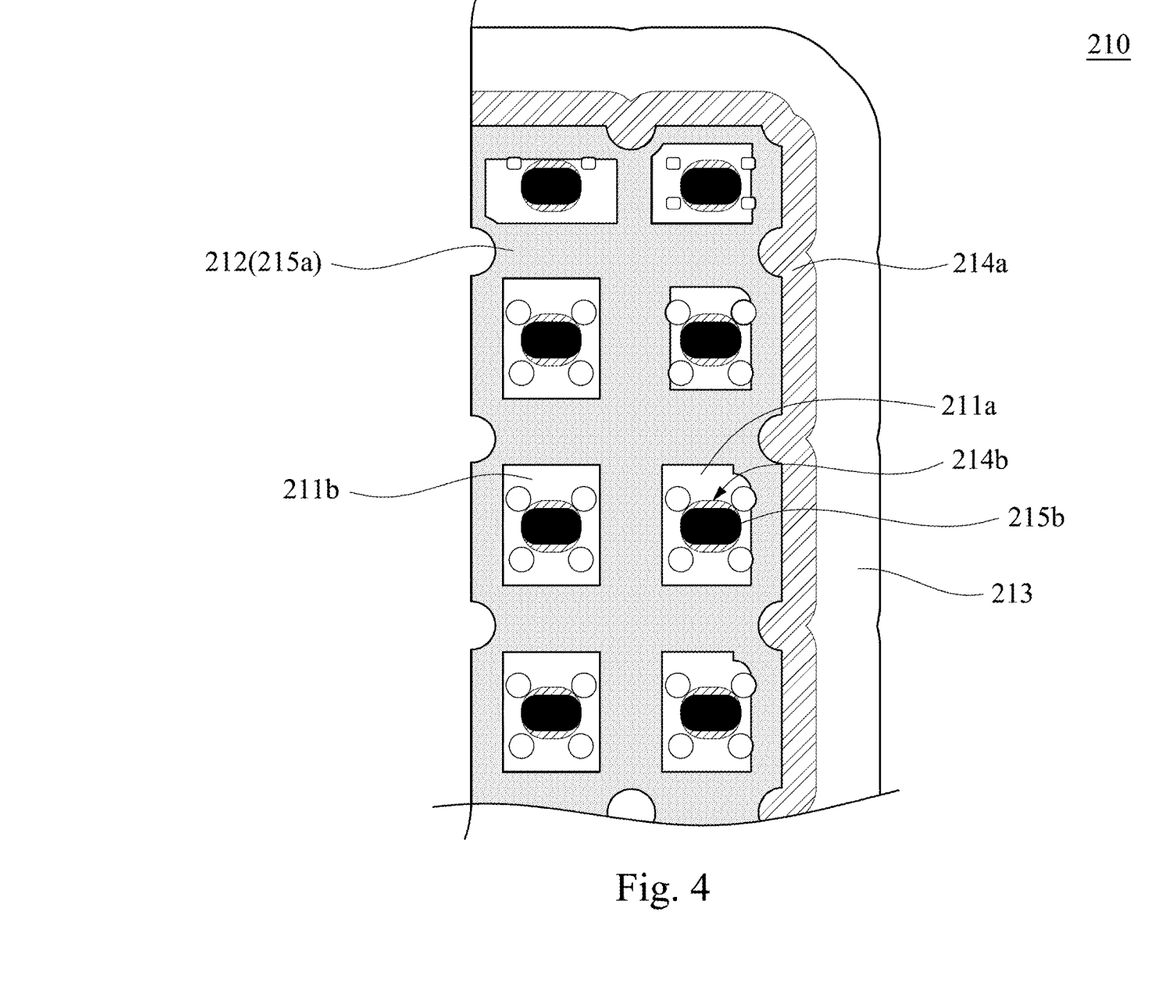
FIG. 4 is a partial schematic diagram of a film in FIG. 2.

Please refer to FIG. 4, which is a partial schematic diagram of the film 210 in FIG. 2. As shown in FIGS. 3 and 4, in this embodiment, the film 210 includes a plurality of single-key transparent areas 211a, 211b, a light-shielding area 212, and a side transparent area 213. The single-key transparent areas 211a respectively correspond to the key units 121 at an outermost edge, and the single-key transparent areas 211b respectively correspond to other key units 121 except the key units 121 at the outermost edge. The light-shielding area 212 is disposed around the single-key transparent areas 211a, 211b.

As shown in FIGS. 3 and 4, a light-shielding portion 215a is disposed on a surface of the film 210. The light-shielding portion 215a is configured to shield a light emitted directly upward between light-emitting units 231a. The light-shielding area 212 is an area where the film 210 is provided with the light-shielding portion 215a. The side transparent area 213 is disposed adjacent to or along an edge of the film 210. Specifically, the single-key transparent areas 211a, 211b are located within a periphery of the light-shielding area 212. The side transparent area 213 is located outside the periphery of the light-shielding area 212.

In some embodiments, as shown in FIGS. 3 and 4, the side transparent area 213 is arranged in an annular shape along four edges of the film 210, but is not limited thereto. In practical applications, the side transparent area 213 may be arranged along at least one of an upper edge, a lower edge, a left edge, and a right edge of the film 210.

Figure 5:
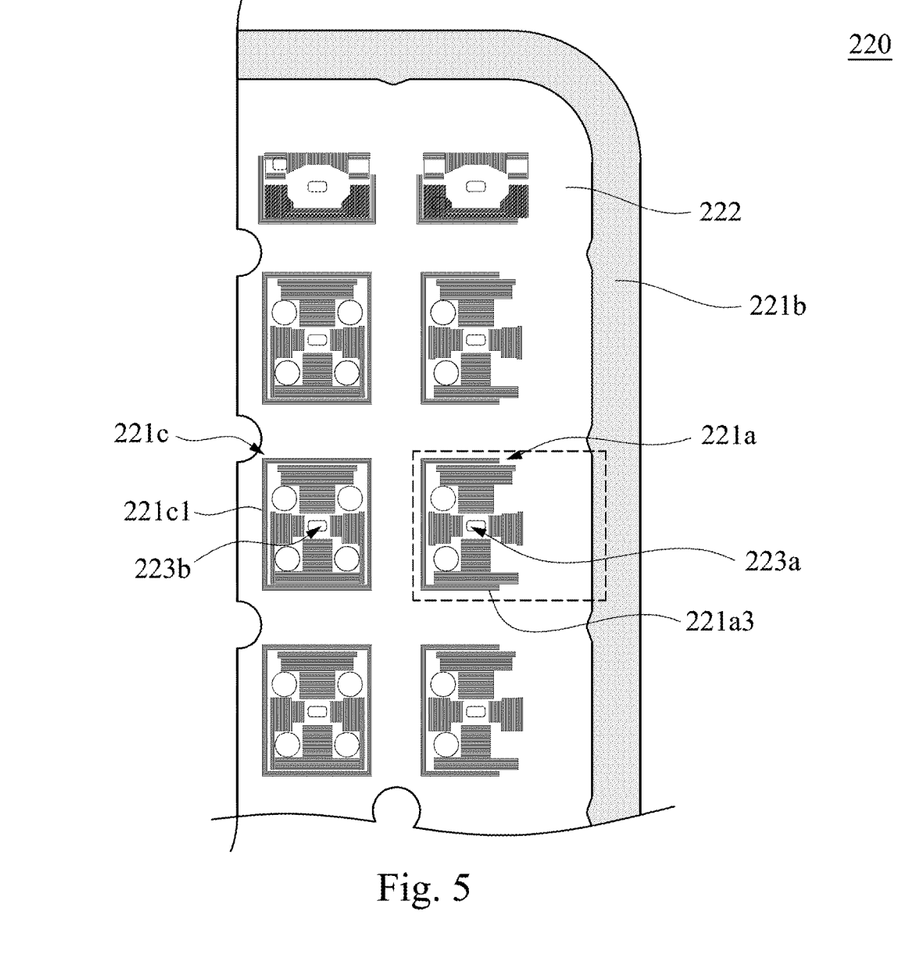
FIG. 5 is a partial schematic diagram of a light guide plate in FIG. 2.
Figure 7:
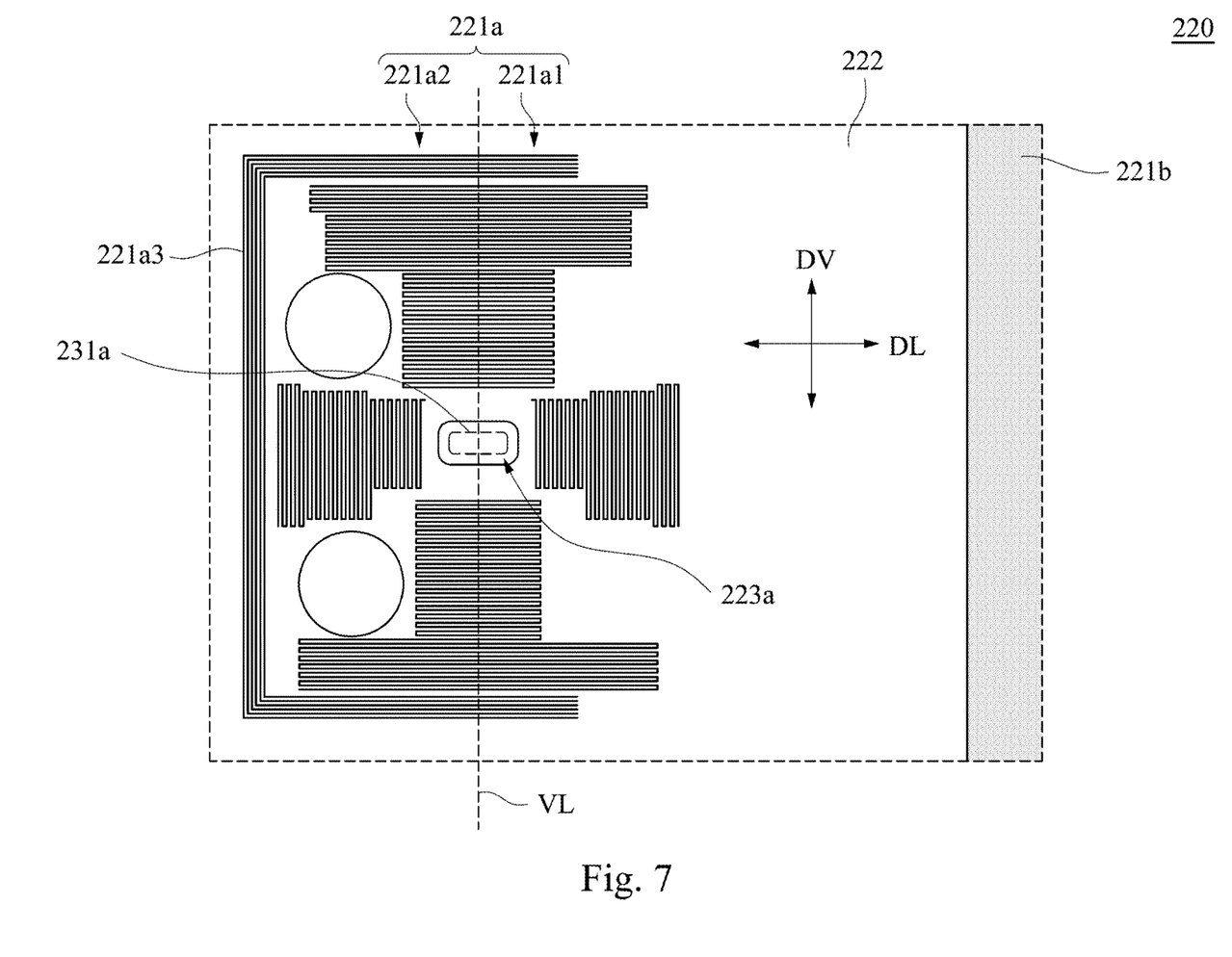
FIG. 7 is a partial enlarged view of the light guide plate in FIG. 5.

Please refer to FIG. 5, which is a partial schematic diagram of the light guide plate 220 in FIG. 2. As shown in FIGS. 3 and 5, in this embodiment, the light guide plate 220 is disposed under the film 210. The light guide plate 220 has a first microstructure group 221a, a second microstructure group 221b, a third microstructure group 221c, a light-transmitting area 222, and a plurality of through holes 223a, 223b. The first microstructure group 221a and the through hole 223a are correspondingly disposed under the single-key transparent area 211a. The second microstructure group 221b is correspondingly disposed under the side transparent area 213. The third microstructure group 221c and the through hole 223b are correspondingly disposed under the single-key transparent area 211b. The first microstructure group 221a, the second microstructure group 221b, and the third microstructure group 221c include a plurality of microstructures. The microstructures may include point-like microstructures, linear microstructures (as shown in FIG. 7), or other shaped microstructures, or a combination thereof. A part of the light-transmitting area 222 is correspondingly disposed under the light-shielding area 212. Specifically, the light-transmitting area 222 includes a region among the first microstructure group 221a, the second microstructure group 221b, and the third microstructure group 221c, and regions among the microstructures of the first microstructure group 221a, the second microstructure group 221b, and the third microstructure group 221c. The light-shielding portion 215a in the light-shielding area 212 is configured to block a part of a light transmitted upward by the light-transmitting area 222 from passing through.

In this embodiment, the second microstructure group 221b is a continuous linear microstructure extending along the edge of the film 210. In some embodiments, the second microstructure group 221b may include a plurality of microstructure units arranged at the same or different intervals, and the microstructure units may be shaped as squares, rectangles, circles, or other shapes.

Figure 6:
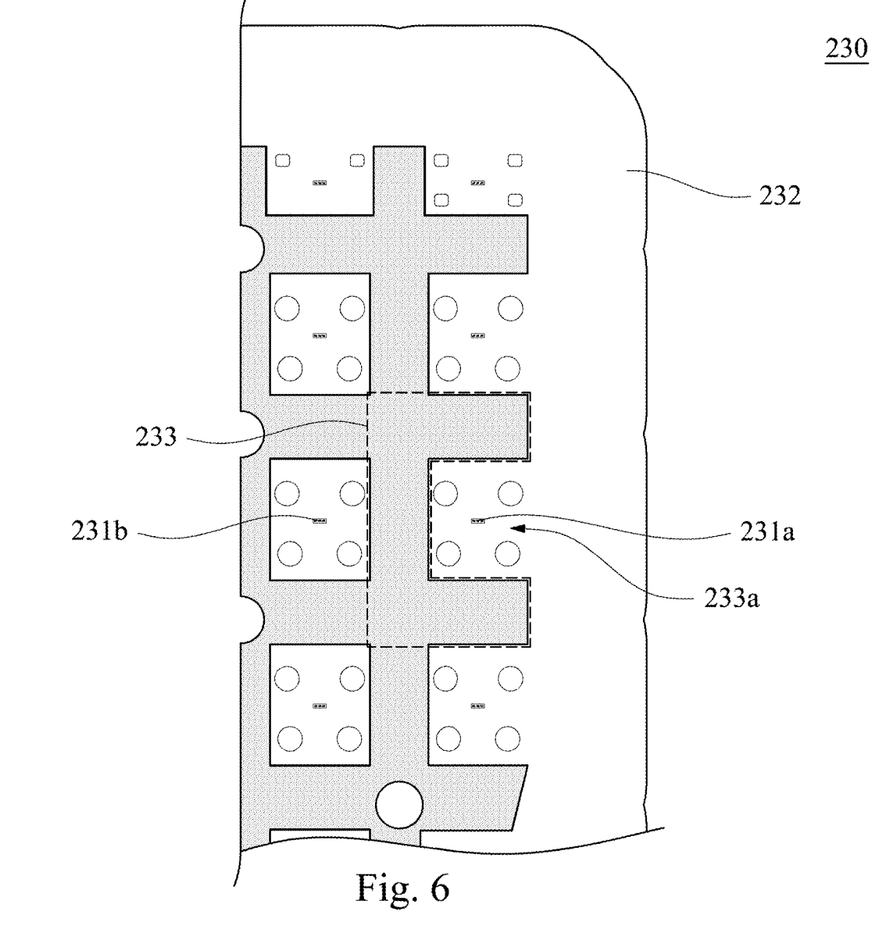
FIG. 6 is a partial schematic diagram of a circuit board in FIG. 2.

Please refer to FIG. 6, which is a partial schematic diagram of the circuit board 230 in FIG. 2. As shown in FIGS. 3 and 6, in this embodiment, a plurality of the light-emitting units 231a, 231b are disposed on the circuit board 230. The light-emitting units 231a, 231b are respectively accommodated in the through holes 223a, 223b. A part of a light emitted by the light-emitting unit 231a is guided upward by the first microstructure group 221a to pass through the single-key transparent area 211a. Another part of the light emitted by the light-emitting unit 231a is transmitted through the light-transmitting area 222 and is guided upward by the second microstructure group 221b to pass through the side transparent area 213. A part of a light emitted by the light-emitting unit 231b is guided upward by the third microstructure group 221c to pass through the single-key transparent area 211b. Another part of the light emitted by the light-emitting unit 231b is transmitted through the light-transmitting area 222 and is guided upward by the second microstructure group 221b to pass through the side transparent area 213.

Through the aforementioned structural configuration, the light emitted by the light-emitting unit 231a can not only be guided upward by the first microstructure group 221a to pass through the single-key transparent area 211a, but can also be guided upward by the second microstructure group 221b to pass through the side transparent area 213. Meanwhile, the light emitted by the light-emitting unit 231b can not only be guided upward by the third microstructure group 221c to pass through the single-key transparent area 211b, but can also be guided upward by the second microstructure group 221b to pass through the side transparent area 213. Accordingly, in the backlight module 200 of this embodiment, the same light-emitting units 231a, 231b not only provides a luminous effect in the single-key transparent areas 211a, 211b, but also provides an additional luminous effect in the side transparent area 213, thereby increasing variability of the luminous effect without adding additional light-emitting units or backlight modules.

As shown in FIGS. 3 and 5, in this embodiment, the second microstructure group 221b under the side transparent area 213 is further away from the light-emitting unit 231a than the first microstructure group 221a under the single-key transparent area 211a. In view of this, a light-emitting area of the second microstructure group 221b is greater than a light-emitting area of the first microstructure group 221a, which can effectively make a light output brightness of the side transparent area 213 substantially the same or similar to a light output brightness of the single-key transparent area 211a.

In some embodiments, the light-emitting area of the first microstructure group 221a may be defined as a sum of areas occupied by all microstructures of the first microstructure group 221a; and the light-emitting area of the second microstructure group 221b may be defined as a sum of areas occupied by all microstructures of the second microstructure group 221b.

In other embodiments, when a size of the microstructures of the first microstructure group 221a is substantially the same as a size of the microstructures of the second microstructure group 221b, a number of the microstructures of the second microstructure group 221b may be greater than a number of the microstructures of the first microstructure group 221a, so as to effectively make the light output brightness of the side transparent area 213 substantially the same or similar to the light output brightness of the single-key transparent area 211a.

As shown in FIGS. 1 and 2, in this embodiment, the housing 110 is embedded with a semi-transparent black portion 111. The semi-transparent black portion 111 is disposed above the side transparent area 213. When the light-emitting unit 231a does not emit light, no light is emitted through the side transparent area 213, so a user can only see the dark semi-transparent black portion 111, and cannot see components disposed inside the housing 110 through the semi-transparent black portion 111. On the contrary, when the light-emitting unit 231a emits light, the light is emitted through the side transparent area 213 and emitted from the semi-transparent black portion 111 to be seen by the user. A projection of the semi-transparent black portion 111 on the film 210 falls within the side transparent area 213, and an area of the semi-transparent black portion 111 is less than or equal to an area of the side transparent area 213.

As shown in FIGS. 3 and 4, in this embodiment, a reflective portion 214a is further disposed on the surface of the film 210. The reflective portion 214a is disposed around the light-shielding area 212. That is, the reflective portion 214a is disposed around the light-shielding portion 215a. The reflective portion 214a is configured to reflect the light emitted by the light-emitting unit 231a and the light transmitted upward from the light-transmitting area 222 back to the light guide plate 220, thereby effectively reducing light loss and increasing a light extraction efficiency of the backlight module 200 in the side transparent area 213.

As shown in FIG. 3, in this embodiment, film 210 further includes a light-shielding member 215b. The light-shielding member 215b is disposed above the light-emitting unit 231a. The light-shielding member 215b is configured to block the light emitted directly upward by the light-emitting unit 231a. This can effectively avoid a problem of uneven brightness of characters caused by the light emitted upward by the light-emitting unit 231a directly irradiating the key unit 121.

In some embodiments, the light-shielding portion 215a and the light-shielding member 215b may be a black ink layer or a coating made of other light-shielding materials, and may be formed on a bottom surface of the film 210 (i.e., a surface of the film 210 facing the light guide plate 220) using, for example, a printing process, but are not limited thereto. The light-shielding portion 215a and the light-shielding member 215b may also be disposed on a top surface of the film 210 (i.e., a surface of the film 210 away from the light guide plate 220).

In other embodiments, the film 210 further includes a reflective member 214b. The reflective member 214b may replace the light-shielding member 215b or cover the light-shielding member 215b. The reflective member 214b is configured to reflect the light emitted directly upward by the light-emitting unit 231a back to the light guide plate 220, thereby increasing an amount of light entering the light guide plate 220.

In some embodiments, the reflective portion 214a and the reflective member 214b may be a white ink layer or a coating made of other reflective materials, and may be formed on the bottom surface of the film 210 using, for example, a printing process, but are not limited thereto. The reflective portion 214a and the reflective member 214b may also be disposed on the top surface of the film 210.

As shown in FIGS. 3 and 6, in this embodiment, a reflective layer 232 is disposed on a surface of the circuit board 230 facing the light guide plate 220. The reflective layer 232 is configured to reflect a part of the light emitted by the light-emitting unit 231a and the light transmitted downward from the light-transmitting area 222 back to the light guide plate 220, thereby effectively reducing light loss and increasing the light extraction efficiency of the backlight module 200 in each transparent area.

As shown in FIGS. 3 and 6, in this embodiment, a plurality of light-blocking units 233 are disposed on a surface of the reflective layer 232 facing the light guide plate 220. Each light-blocking unit 233 is disposed corresponding to a part of the light-shielding area 212. Specifically, a projection of each light-blocking unit 233 on the film 210 surrounds the single-key transparent area 211a and is located in the light-shielding area 212. Each light-blocking unit 233 has an opening 233a on a side close to the side transparent area 213. For example, the light-blocking unit 233 corresponding to the light-emitting unit 231a on one side of the circuit board 230 is U-shaped (as shown by a dotted line in FIG. 6), and the light-blocking unit 233 corresponding to the light-emitting units 231a on two adjacent sides of the circuit board 230 is L-shaped. Each light-blocking unit 233 is configured to block a part of the light emitted by the light-emitting unit 231a and the light transmitted downward from the light-transmitting area 222 from being reflected back to the light guide plate 220. That is, when the light reaches the light-blocking unit 233, it is blocked by the light-blocking unit 233, and therefore is no longer transmitted to the adjacent single-key transparent areas 211a and/or the single-key transparent areas 211b. Another part of the light emitted by the light-emitting unit 231a is reflected back to the light guide plate 220 through a part of the reflective layer 232 under the opening 233a of the light-blocking unit 233. Therefore, the lights emitted by the light-emitting units 231a, 231b respectively located under different single-key transparent areas 211a, 211b are blocked by the light-blocking units 233 and do not interfere with each other, and the opening 233a of the light-blocking unit 233 allows the light emitted by the light-emitting unit 231a to reach the side transparent area 213 without hindrance.

Please refer to FIG. 7, which is a partial enlarged view of the light guide plate 220 in FIG. 5. As shown in FIGS. 5 and 7, in this embodiment, the first microstructure group 221a includes a first zone 221a1 and a second zone 221a2. The first zone 221a1 is located between the second microstructure group 221b and the second zone 221a2. A light-emitting area of the first zone 221a1 is less than a light emitting area of the second zone 221a2, that is, an amount of light emitted by the light-emitting unit 231a and emitted from the first zone 221a1 is less than an amount of light emitted by the light-emitting unit 231a and emitted from the second zone 221a2. By reducing the amount of the light emitted from the first zone 221a1, more of the light emitted by the light-emitting unit 231a can be transmitted to the side transparent area 213. Specifically, most of the light emitted by the light-emitting unit 231a and reaching the second zone 221a2 will be guided upward and output, and will not continue to be transmitted to the adjacent third microstructure group 221c. Furthermore, a part of the light emitted by the light-emitting unit 231a and reaching the first zone 221a1 is guided upward and output, and the other part continues to be transmitted to the second microstructure group 221b to output.

Furthermore, as shown in FIGS. 5 and 7, the first microstructure group 221a may include a plurality of outer frame microstructures 221a3. The outer frame microstructures 221a3 are located at an outer edge of the first microstructure group 221a. Thereby, most of the light emitted by the light-emitting unit 231a and reaching the outer frame microstructures 221a3 is guided upward and output, and will not continue to be transmitted to the adjacent single-key transparent areas 211a and/or the single-key transparent areas 211b, thereby preventing optical interference with the adjacent single-key transparent areas 211a and/or the single-key transparent areas 211b. In some embodiments, the third microstructure group 221c may also include a plurality of outer frame microstructures 221c1. Thereby, most of the light emitted by the light-emitting unit 231b and reaching the outer frame microstructures 221c1 will be guided upward and output, and will not continue to be transmitted to the adjacent single-key transparent areas 211a and/or the single-key transparent areas 211b, thereby preventing optical interference with the adjacent single-key transparent areas 211a and/or the single-key transparent areas 211b.

In some embodiments, the light-emitting area of the first zone 221a1 may be defined as a sum of areas occupied by all microstructures in the first zone 221a1, and the light-emitting area of the second zone 221a2 may be defined as a sum of areas occupied by all microstructures in the second zone 221a2.

In other embodiments, when a size of the microstructures in the first zone 221a1 is substantially the same as a size of the microstructures in the second zone 221a2, a number of the microstructures in the first zone 221a1 may be less than a number of the microstructures in the second zone 221a2, so as to reduce the amount of the light emitted from the first zone 221a1, so that more of the light emitted by the light-emitting unit 231a can be transmitted to the side transparent area 213.

Furthermore, as shown in FIG. 7, in this embodiment, the light-emitting area of the second microstructure group 221b is greater than the light-emitting area of the first zone 221a1, so as to effectively make the light output brightness of the side transparent area 213 substantially the same or similar to the light output brightness of the first zone 221a1.

In other embodiments, when the size of the microstructures of the second microstructure group 221b is substantially the same as the size of the microstructures in the first zone 221a1, the number of the microstructures of the second microstructure group 221b may be less than the number of the microstructures in the first zone 221a1, so as to effectively make the light output brightness of the side transparent area 213 substantially the same or similar to the light output brightness of the first zone 221a1.

It should be noted that the amount of the light emitted from the second zone 221a2 is greater than the amount of the light emitted from the first zone 221a1, but the first zone 221a1 and the second zone 221a2 are both close to the light-emitting unit 231a, so there is no obvious difference in visual experience of the user.

As shown in FIG. 7, in this embodiment, the first zone 221a1 and the second zone 221a2 are separated by a virtual extension line VL passing through a center of the first light-emitting unit 231a. The virtual extension line VL shown in FIG. 7 is a straight line, but is not limited thereto.

As shown in FIG. 7, in this embodiment, the second zone 221a2, the first zone 221a1, and the second microstructure group 221b are sequentially arranged in a transverse direction DL, and the virtual extension line VL extends in a longitudinal direction DV perpendicular to the transverse direction DL, but is not limited thereto. In other embodiments, the second zone 221a2, the first zone 221a1, and the second microstructure group 221b are sequentially arranged in the longitudinal direction DV, and the virtual extension line VL extends in the transverse direction DL.

From the above detailed description of the specific embodiments of the present disclosure, it can be clearly seen that in the backlight module of the present disclosure, the film includes the single-key transparent area and the side transparent area, and the first microstructure group and the second microstructure group of the light guide plate are correspondingly disposed under the single-key transparent area and the side transparent area, respectively. In this way, a part of the light emitted by the light-emitting unit disposed under the single-key transparent area can be guided upward by the first microstructure group to pass through the single-key transparent area, and another part of the light can be guided upward by the second microstructure group to pass through the side transparent area.

Accordingly, in the backlight module of the present disclosure, the same light-emitting unit not only provides a luminous effect in the single-key transparent area, but also provides an additional luminous effect in the side transparent area, thereby increasing variability of the luminous effect without adding additional light-emitting units or backlight modules.

Although the present disclosure is disclosed in the above embodiments, the embodiments are not intended to limit the present disclosure. Anyone skilled in the art can make various changes and modifications without departing from the spirit and scope of the present disclosure. Therefore, the protection scope of the present disclosure shall be determined by the appended claims.

What is claimed is:

1. A backlight module, comprising:
a film comprising a single-key transparent area, a light-shielding area, and a side transparent area, wherein the light-shielding area is disposed around the single-key transparent area, and the side transparent area is disposed adjacent to or along an edge of the film;
a light guide plate disposed under the film and having a first microstructure group, a second microstructure group, a light-transmitting area, and a through hole, wherein the first microstructure group and the through hole are correspondingly disposed under the single-key transparent area, the second microstructure group is correspondingly disposed under the side transparent area, and a part of the light-transmitting area is correspondingly disposed under the light-shielding area; and
a circuit board disposed under the light guide plate and provided with a light-emitting unit, wherein the light-emitting unit is accommodated in the through hole;
wherein a part of a light emitted by the light-emitting unit is guided upward by the first microstructure group to pass through the single-key transparent area, another part of the light emitted by the light-emitting unit is transmitted through the light-transmitting area and is guided upward by the second microstructure group to pass through the side transparent area, and a number of microstructures or a light-emitting area of the second microstructure group is greater than a number of microstructures or a light-emitting area of the first microstructure group.

2. The backlight module of claim 1, wherein the film further comprises a reflective portion, the reflective portion is disposed around the light-shielding area, and the reflective portion is configured to reflect the light emitted by the light-emitting unit back to the light guide plate.

3. The backlight module of claim 1, wherein the film further comprises a light-shielding member or a reflective member, the light-shielding member or the reflective member is disposed above the light-emitting unit, the light-shielding member is configured to block the light emitted directly upward by the light-emitting unit, and the reflective member is configured to reflect the light emitted directly upward by the light-emitting unit back to the light guide plate.

4. The backlight module of claim 1, wherein a reflective layer is disposed on a surface of the circuit board facing the light guide plate, and the reflective layer is configured to reflect the light emitted by the light-emitting unit back to the light guide plate.

5. The backlight module of claim 4, wherein a light-blocking unit is disposed on a surface of the reflective layer facing the light guide plate, the light-blocking unit is disposed corresponding to a part of the light-shielding area, the light-blocking unit has an opening on a side close to the side transparent area, the light-blocking unit is configured to block another part of the light emitted by the light-emitting unit from being reflected back to the light guide plate, and another part of the light emitted by the light-emitting unit is reflected back to the light guide plate through a part of the reflective layer under the opening of the light-blocking unit.

6. The backlight module of claim 1, wherein the first microstructure group comprises a first zone and a second zone, the first zone is located between the second microstructure group and the second zone, and a number of microstructures or a light-emitting area of the first zone is less than a number of microstructures or a light-emitting area of the second zone.

7. The backlight module of claim 6, wherein the first zone and the second zone are separated by a virtual extension line passing through a center of the light-emitting unit.

8. The backlight module of claim 6, wherein the number of the microstructures or the light-emitting area of the second microstructure group is greater than the number of the microstructures or the light-emitting area of the first zone.

9. The backlight module of claim 1, wherein the side transparent area is arranged along at least one of an upper edge, a lower edge, a left edge, and a right edge of the film.

10. The backlight module of claim 1, wherein the side transparent area is located outside the light-shielding area.

11. The backlight module of claim 1, wherein the second microstructure group is a continuous linear microstructure or comprises a plurality of microstructure units.

12. A backlight module, comprising:
a film comprising a first single-key transparent area, a second single-key transparent area, a light-shielding area, and a side transparent area, wherein the light-shielding area is disposed around the first single-key transparent area and the second single-key transparent area, and the side transparent area is disposed adjacent to or along an edge of the film;
a light guide plate disposed under the film and having a first microstructure group, a second microstructure group, a third microstructure group, a light-transmitting area, a first through hole, and a second through hole, wherein the first microstructure group and the first through hole are correspondingly disposed under the first single-key transparent area, the second microstructure group is correspondingly disposed under the side transparent area, the third microstructure group and the second through hole are correspondingly disposed under the second single-key transparent area, a part of the light-transmitting area is correspondingly disposed under the light-shielding area, the first microstructure group comprises a first zone and a second zone, the first zone is located between the second microstructure group and the second zone, and a number of microstructures or a light-emitting area of the second microstructure group is greater than a number of microstructures or a light-emitting area of the first zone; and
a circuit board disposed under the light guide plate and provided with a first light-emitting unit and a second light-emitting unit, wherein the first light-emitting unit and the second light-emitting unit are respectively accommodated in the first through hole and the second through hole;
wherein a part of a light emitted by the first light-emitting unit is guided upward by the first microstructure group to pass through the first single-key transparent area, and another part of the light emitted by the first light-emitting unit and a part of a light emitted by the second light-emitting unit are transmitted through the light-transmitting area and are guided upward by the second microstructure group to pass through the side transparent area.

13. The backlight module of claim 12, wherein the number of the microstructures or the light-emitting area of the first zone is less than a number of microstructures or a light-emitting area of the second zone.

14. The backlight module of claim 12, wherein the film further comprises a light-shielding member or a reflective member, the light-shielding member or the reflective member is disposed above the first light-emitting unit, the light-shielding member is configured to block the light emitted directly upward by the first light-emitting unit, and the reflective member is configured to reflect the light emitted directly upward by the first light-emitting unit back to the light guide plate.

15. The backlight module of claim 12, wherein the first zone and the second zone are separated by a virtual extension line passing through a center of the first light-emitting unit.

16. The backlight module of claim 12, wherein the number of the microstructures or the light-emitting area of the second microstructure group is greater than a number of microstructures or a light-emitting area of the first microstructure group.

17. The backlight module of claim 12, wherein the side transparent area is located outside the light-shielding area.

18. The backlight module of claim 12, wherein a reflective layer is disposed on a surface of the circuit board facing the light guide plate, and the reflective layer is configured to reflect the light emitted by the first light-emitting unit and the light emitted by the second light-emitting unit back to the light guide plate.

19. The backlight module of claim 12, wherein the film further comprises a reflective portion, the reflective portion is disposed around the light-shielding area, and the reflective portion is configured to reflect the light emitted by the first light-emitting unit and the light emitted by the second light-emitting unit back to the light guide plate.

20. The backlight module of claim 12, wherein the third microstructure group comprises a plurality of outer frame microstructures.

* * * * *